(12) United States Patent
Polegato Moretti (10) Patent No.: US 8,245,417 B2
(45) Date of Patent: Aug. 21, 2012

(54) VAPOR-PERMEABLE WATERPROOF SOLE FOR SHOES, SHOE WHICH USES SAID SOLE, AND METHOD FOR MANUFACTURING SAID SOLE AND SAID SHOE

(75) Inventor: Mario Polegato Moretti, Crocetta del Montello (IT)

(73) Assignee: GEOX S.p.A., Montebelluna (IT)

( * ) Notice: Subject to any disclaimer, the term of this patent is extended or adjusted under 35 U.S.C. 154(b) by 483 days.

(21) Appl. No.: 12/515,759

(22) PCT Filed: Nov. 20, 2007

(86) PCT No.: PCT/EP2007/010045
§ 371 (c)(1),
(2), (4) Date: May 21, 2009

(87) PCT Pub. No.: WO2008/061710
PCT Pub. Date: May 29, 2008

(65) Prior Publication Data
US 2010/0011624 A1    Jan. 21, 2010

(30) Foreign Application Priority Data

Nov. 23, 2006    (IT) .............................. PD2006A0437

(51) Int. Cl.
*A43B 13/12* (2006.01)
*A43B 13/18* (2006.01)

(52) U.S. Cl. ............. 36/30 R; 36/3 R; 36/3 B; 264/109; 156/60

(58) Field of Classification Search .................... 36/3 R, 36/3 A, 3 B, 30 R, 25 R; 264/109; 156/60
See application file for complete search history.

(56) References Cited

U.S. PATENT DOCUMENTS

| 4,507,880 A | * | 4/1985 | Ohashi ............................ 36/115 |
| 5,983,524 A | * | 11/1999 | Polegato ......................... 36/3 R |
| 6,260,288 B1 | * | 7/2001 | Barthelemy et al. ............ 36/3 R |
| 6,389,711 B1 | * | 5/2002 | Polegato ......................... 36/3 R |

(Continued)

FOREIGN PATENT DOCUMENTS

WO    97 14326    4/1997

(Continued)

OTHER PUBLICATIONS

U.S. Appl. No. 13/091,355, filed Apr. 21, 2011, Polegato Moretti, et al.

*Primary Examiner* — Marie Patterson
(74) *Attorney, Agent, or Firm* — Oblon, Spivak, McClelland, Maier & Neustadt, L.L.P.

(57) ABSTRACT

A vapor-permeable and waterproof sole for shoes, including a tread including a plurality of through holes, a multilayer pack, arranged superimposed on the region where the through holes are provided and including a membrane, permeable to water vapor and impermeable to liquids, and a protective layer, arranged directly below the membrane. The tread is overmolded onto the pack and further surrounds the edges, the lower perimetric portion, and the upper perimetric portion of the pack to form a perimetric seal adapted to avoid rise of liquids. The pack includes a vapor-permeable or perforated layer element, arranged directly below the protective layer, superimposed on the through holes region. The layer-like element avoids contact of the molding polymeric material with the protective layer during tread molding, and is further associated with the protective layer.

34 Claims, 4 Drawing Sheets

U.S. PATENT DOCUMENTS

| | | |
|---|---|---|
| 6,408,541 B1 | 6/2002 | Polegato Moretti |
| 6,681,500 B2 * | 1/2004 | Moretti .......................... 36/3 B |
| 6,823,609 B2 * | 11/2004 | Moretti ......................... 36/30 R |
| 6,839,984 B2 * | 1/2005 | Polegato ........................ 36/3 B |
| 7,096,604 B2 * | 8/2006 | Polegato Moretti .......... 36/30 R |
| 2002/0040537 A1 * | 4/2002 | Polegato Moretti ............. 36/14 |
| 2004/0035022 A1 | 2/2004 | Polegato Moretti |
| 2005/0126036 A1 * | 6/2005 | Wu .................................. 36/3 B |
| 2005/0172513 A1 * | 8/2005 | Lechhart et al. ................ 36/3 B |
| 2005/0241082 A1 * | 11/2005 | Moretti ....................... 12/142 V |
| 2005/0252035 A1 * | 11/2005 | Moretti et al. .................. 36/3 B |

FOREIGN PATENT DOCUMENTS

| | | |
|---|---|---|
| WO | 01 21023 | 3/2001 |
| WO | 02 32246 | 4/2002 |
| WO | 2004 004505 | 1/2004 |

* cited by examiner

VAPOR-PERMEABLE WATERPROOF SOLE FOR SHOES, SHOE WHICH USES SAID SOLE, AND METHOD FOR MANUFACTURING SAID SOLE AND SAID SHOE

TECHNICAL FIELD

The present invention relates to a vapor-permeable and waterproof sole for shoes.

BACKGROUND ART

The present invention also relates to a shoe manufactured with said sole.

The invention also comprises a method for manufacturing said sole and said shoe.

Soles for shoes which are waterproof and permeable to water vapor have now been known for several years.

In this manner, the soles allow the escape of the water vapor generated by perspiration at the sole of the foot, with an obvious improvement in shoe comfort.

A sole of this type is disclosed for example in U.S. Pat. No. 5,044,096, which relates to a vapor-permeable sole which consists of two layer-like portions, respectively an upper portion and a lower portion of a sole, which are made of rubber or other synthetic material and are provided with through holes, and consists in interposing between them a membrane which is impermeable to water and permeable to water vapor and is joined hermetically at its perimeter to the two portions so as to not allow water infiltrations.

Other solutions proposed by the Inventor of record of U.S. Pat. No. 5,044,096 and derived from the use of a vapor-permeable and waterproof membrane inside a sole with a perforated tread are disclosed in subsequent patents.

For example, WO97/14326 discloses a method for manufacturing a shoe which provides a waterproof and vapor-permeable sole which is injected directly onto an upper which is preassembled on a last for molding by direct injection.

The manufacture of the shoe entails injecting into a first mold the lower portion of perforated tread (the portion of the tread that goes into direct contact with the ground).

Subsequently, from the bottom upwardly, the lower tread element that has just been formed, a protective layer arranged so as to be superimposed on the region where the tread holes are formed, a vapor-permeable and waterproof membrane, and finally a vapor-permeable or perforated filler layer, are inserted in a second mold.

The second mold is closed so that the insole of the upper that is preassembled on the last compresses the three layer-like elements described above against the lower tread element.

A second portion of tread is then injected, surrounds said layer-like elements and is joined monolithically to the lower tread element; said second tread portion further forms, on said layer-like elements, a perimetric seal which avoids the rise of liquids.

This manufacturing method therefore entails two separate molds with two steps for preparing them.

The document WO97/14326 discloses a second embodiment.

In this case, the shoe comprises a waterproof and vapor-permeable sole which is directly injected onto an upper which is preassembled on a last for direct injection molding.

The manufacture provides for inserting into the mold a pack which is constituted, from the bottom upwardly, by a protective layer, by a vapor-permeable and waterproof membrane, and by a filler layer.

The mold is closed so that the insole of the preassembled upper compresses the three components of the pack towards the bottom of the mold cavity, on which there are small pins which provide the holes of the tread.

By injecting the material of the tread into a mold, a sole is formed which couples rigidly to the upper and incorporates internally the pack, in practice sealing the membrane perimetrically and thus preventing the rise of liquids outside its edges.

In this embodiment, the injected polymeric material may attack the protective layer, passing through it, with consequent risk of damaging the membrane or of inhibiting its vapor permeability.

DISCLOSURE OF THE INVENTION

The aim of the present invention is to solve the problems observed in the manufacture of shoes with vapor-permeable and waterproof soles.

Within this aim, an object of the present invention is to provide a sole with a vapor-permeable and waterproof membrane which can be manufactured by means of molding technology without the risk of damaging the membrane.

Another object of the present invention is to provide a vapor-permeable and waterproof sole which can be provided by means of molding technology without the possibility of inhibiting its vapor permeability.

Another object of the present invention is to provide a shoe with a vapor-permeable and waterproof sole which is over-molded onto the upper without the risk of inhibiting vapor permeability or of damaging the membrane which simultaneously allows vapor permeability and waterproofing.

Still another object of the present invention is to provide a method for manufacturing by overmolding a vapor-permeable and waterproof sole and a vapor-permeable and waterproof shoe which does not hinder the vapor permeability and waterproofing properties of the sole.

This aim and these and other objects, which will become better apparent hereinafter, are achieved by a vapor-permeable and waterproof sole for shoes, which comprises:

a tread provided with a plurality of through holes;

a multilayer pack, which is arranged so as to be superimposed on the region where said through holes are provided and comprises a membrane which is permeable to water vapor and impermeable to liquids and a protective vapor-permeable or perforated layer which is arranged directly below said membrane;

said tread being of the type which is overmolded onto said pack, said tread further surrounding the lower perimetric portion, the upper perimetric portion and the edges of said pack so as to form a perimetric seal which is adapted to avoid the rise of liquids, said sole being characterized in that said pack comprises a vapor-permeable or perforated layer-like element, which is arranged directly below said protective layer so as to be superimposed on the region where said through holes are provided, said layer-like element being adapted to avoid the contact of the polymeric material for molding with said protective layer during the step for molding the tread, said layer-like element being further associated with said protective layer, forming, between said protective layer and said layer-like element, at least one interface area through which water vapor can flow, said area being adapted to facilitate vapor permeation.

BRIEF DESCRIPTION OF THE DRAWINGS

Further characteristics and advantages of the invention will become better apparent from the description of a preferred but not exclusive embodiment thereof, illustrated by way of non-limiting example in the accompanying drawings, wherein.

It is noted that anything found to be already known during the patenting process is understood not to be claimed and to be the subject of a disclaimer.

WAYS OF CARRYING OUT THE INVENTION

Figure 1:
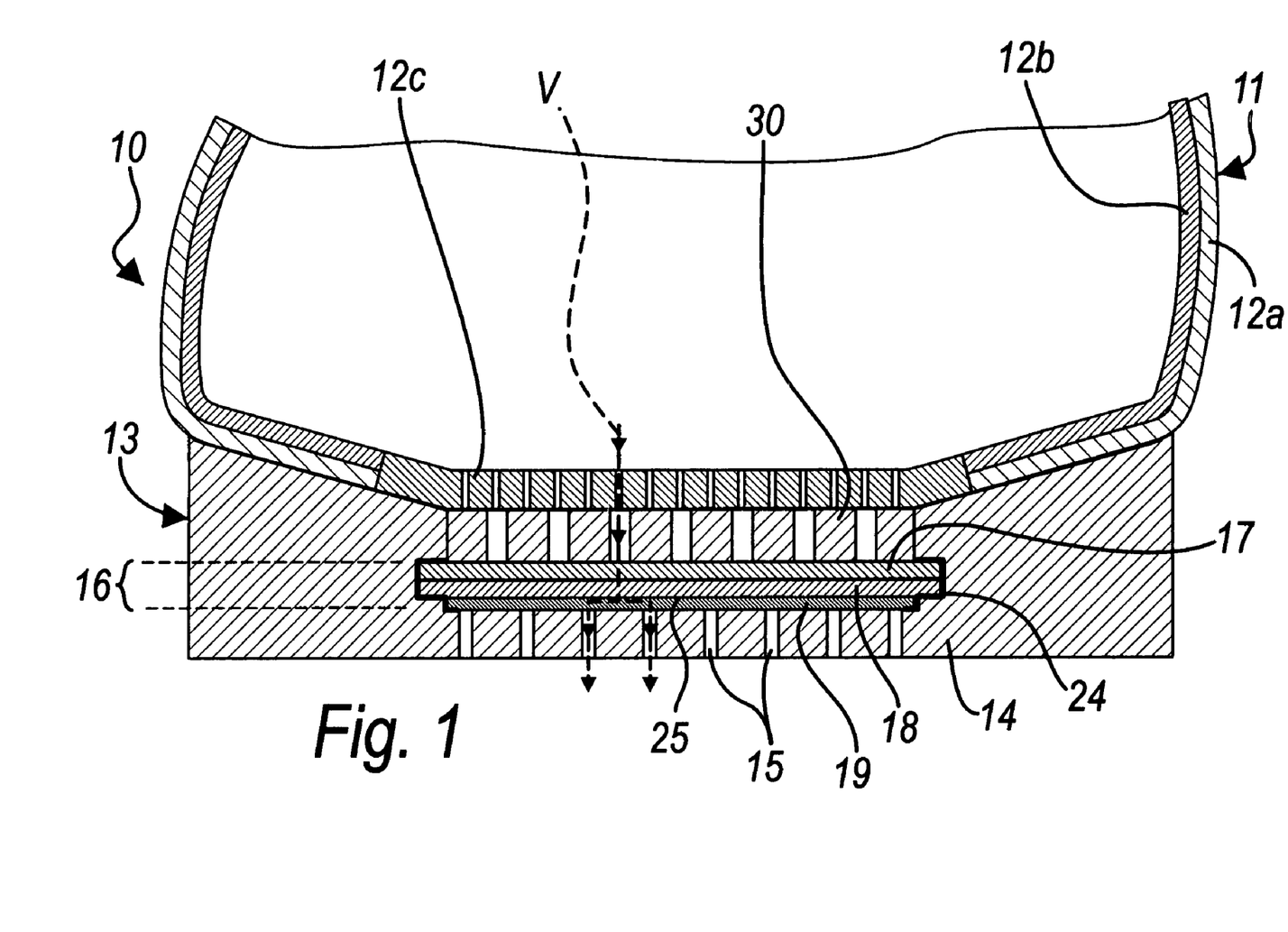
FIG. 1 is a schematic sectional view of a portion of a shoe with the sole according to the invention.

With reference to the figures, a portion of a shoe with a vapor-permeable and waterproof sole according to the invention is generally designated by the reference numeral 10.

The shoe 10 has an upper part 11, which is composed of a vapor-permeable upper 12a, on the inner portion of which there is a likewise vapor-permeable lining 12b; the upper 12a with the lining 12b are closed in a downward region by a perforated or equivalently vapor-permeable insole 12c.

A sole 13 of the vapor-permeable and waterproof type is associated in a downward region to the upper 12a with the lining 12b.

The sole 13 comprises a tread 14 which has a plurality of through holes 15.

A multilayer pack 16 is arranged on top of the region on which the through holes 15 are provided and is formed, from the top downwardly, by a membrane 17 which is permeable to water vapor and impermeable to liquids, by a vapor-permeable or perforated protective layer 18 which is arranged directly below the membrane 17 and is designed to prevent foreign objects from being able to damage the membrane by passing through the holes 15, and by a vapor-permeable layer-like element 19, which is arranged directly below the protective layer 18 so as to be superimposed on the region where the through holes 15 are provided; the layer-like element 19 is in direct contact with the polymeric material that forms the tread, at least at the inlet of the holes 15.

The membrane 17 is preferably of the commercially available type, such as for example those commonly known by the trade names "Gore-Tex" or "Sympatex®".

In this embodiment, the membrane 17 is coupled to a mesh (not shown in the figures) made of synthetic material, which does not compromise its vapor permeability.

The surface dimensions and the shape of the protective layer 18 are substantially the same as those of the membrane 17; in variations (not shown in the figures), the protective layer 18 can have smaller surface dimensions, with its perimetric edge spaced from the edge of the membrane 17 (or alternately reduced in thickness along its perimeter).

The protective layer 18 is made for example of water-repellent material which is capable of drying rapidly, such as for example woven fabric, nonwoven fabric or pile fabric or needle felt.

The membrane 17 and the protective layer 18 are coupled to each other for example by spot gluing, using an adhesive which is resistant to hydrolysis (such as for example adhesives known as "hot melt" or adhesives based on calendered powders).

In this embodiment, the layer-like element 19 is provided, on the face for contact with the protective layer 18, with a small amount of adhesive (arranged in spots or lines) to ensure, during the production step, that such layer-like element adheres temporarily to the protective layer 18, keeping the multilayer pack 16 together.

The layer-like element 19 is constituted preferably by vapor-permeable water-repellent material, which is capable of creating a barrier to the polymeric material that constitutes the tread, as better explained hereinafter; the material that constitutes the layer-like element 19 can be for example nonwoven or pile fabric, leather, or microporous EVA.

The sole is manufactured by formation of the tread in a mold.

Figure 2:
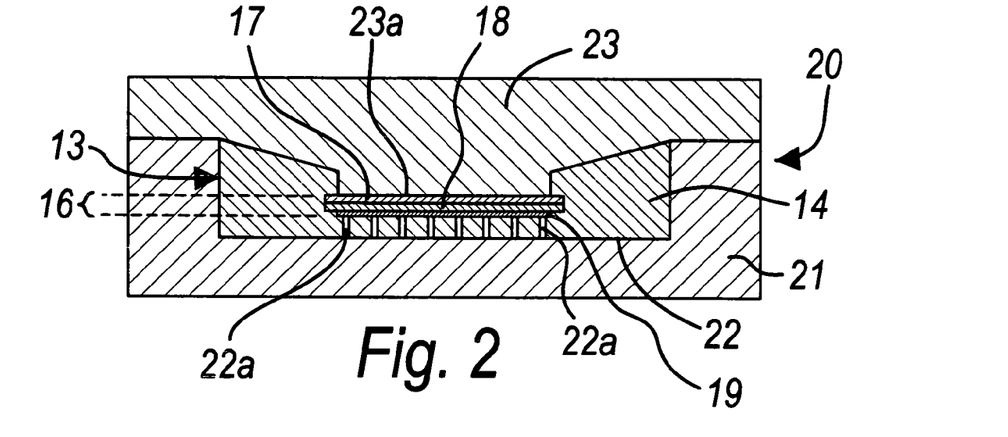
FIG. 2 is a schematic sectional view of a first mold for manufacturing a sole according to the invention.

For example, FIG. 2 shows schematically a first mold, of the type for casting, which is generally designated by the reference numeral 20.

The mold 20 has a lower (half) mold 21, on the bottom 22 of which pins 22a are provided which define the negative of the through holes of the tread, and an upper (half) mold 23.

The molding method is as follows.

The multilayer pack 16 is applied to the top 23a of the upper mold 23 (for example by fixing it with a limited amount of adhesive).

It is possible to preassemble the pack 16 before applying it to the upper mold 23 or to compose it thereon layer by layer.

In both cases, if necessary, a perforated or equivalently vapor-permeable filler layer 30 is applied, for example by means of adhesive distributed in spots, between the top 23a of the upper mold 23 and the top of the multilayer pack 16.

The filler layer 30 has smaller surface dimensions then membrane 17 so as to allow the upward sealing of the pack 16.

One then begins to cast the polymeric material into the lower mold 21, and after casting the necessary amount, the upper mold 23 is closed, with the pack 16 applied thereto.

The mold remains closed until expansion and hardening of the tread, which incorporates the pack 16, has occurred.

The mold 20 is then opened and the sole 13 is extracted.

The pack 16 in practice is an insert of a mold onto which the tread 14 is overmolded.

The structure of the sole is shaped so that the tread 14 surrounds the edges, the lower perimetric portion and the upper perimetric portion of the pack 16, so as to provide a perimetric seal which avoids the rise of liquids, generally designated by the reference numeral 24.

As in the described example, in order to improve the seal 24, the layer-like element 19 can have smaller surface dimensions than the membrane 17 and the protective layer 18, with its perimetric edge spaced from the edge of the protective layer 18.

The layer-like element 19 allows to avoid contact of the polymeric material for molding with the protective layer 18 and the membrane 17 during the molding of the tread 14.

The layer-like element 19 in fact prevents the polymeric material from flowing, during the molding step, beyond the protective layer 18 and reaching the membrane 17, protecting it.

Moreover, by isolating the membrane from the polymeric material, the layer-like element 19 avoids that the portion of tread comprised between the holes 15 that is in contact with the pack 16 prevents the passage of water vapor, thus increasing the outflow of the vapor through the membrane 17, the protective layer 18 and the holes 15.

In practice, the layer-like element 19, in the region where it comes into contact with the polymeric material of the tread, is embedded therein (or in any case becomes monolithic with the polymeric material), without however compromising the functionality of the membrane which, together with the protective layer 18, is substantially free above the region of the through holes 15.

The layer-like element 19 in practice acts as a lower abutment for the polymeric material, forming between said protective layer 18 and the layer-like element 19 at least one interface area 25, through which the water vapor can flow, which facilitates vapor permeation or perspiration; FIG. 1 illustrates with the reference letter V a dashed line which exemplifies a manner of outflow of the water vapor.

If the layer-like element 19 is joined only perimetrically to the protective layer 18, a single large interface area 25 will be obtained, whereas if connection is provided by spots or lines of adhesive, an interface area with a discontinuity or a plurality of interface areas will be respectively provided.

The layer-like element 19 can be associated with the protective layer 18 in different manners beside adhesive bonding, such as for example by high-frequency sewing, or other fixing means; as an alternative, the layer-like element 19 and the protective layer 18 can be simply rested on each other without adhesion means, for example kept stationary in the mold by pressing.

Once the sole 13 has been formed, it is assembled to the upper portion 11 for example by perimetric adhesive bonding.

The method for manufacturing the sole by casting has been disclosed.

Equivalently, molding can occur by injection.

Figure 3A:
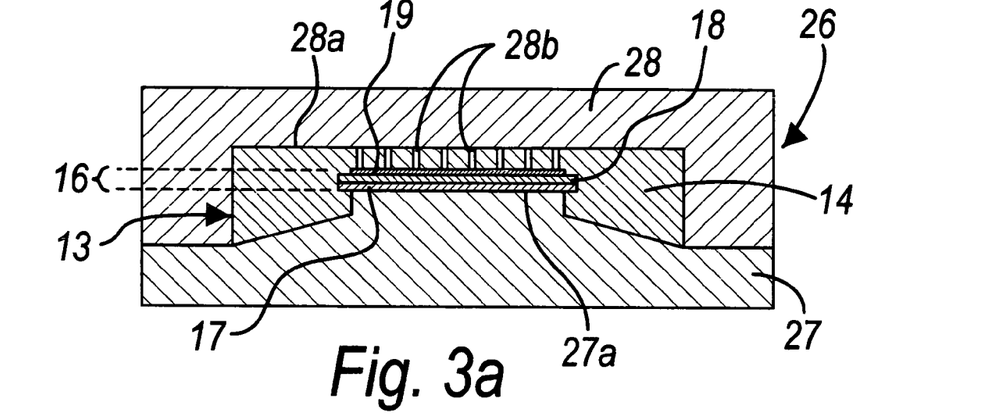
FIG. 3a is a schematic sectional view of a second mold for manufacturing a sole according to the invention.

With reference to FIG. 3a, a second mold, of the injection type, is designated by the reference numeral 26.

In this case, the pack 16 is reversed upside-down, the membrane 17 facing the lower mold 27, and applied to the bottom 27a of the lower (half) mold 27.

In this case also, it is possible to preassemble the pack 16 before applying it to the lower mold 27 or compose it thereon layer by layer.

The upper (half) mold 28 is then closed onto the lower mold 27; the pins 28b, which form the negative of the through holes 15, are provided on the top 28a of the upper mold 28.

The polymeric material is injected so as to form the tread 14 which surrounds the pack 16.

The mold 26 is then opened and the sole 13 is extracted.

Figure 3B:
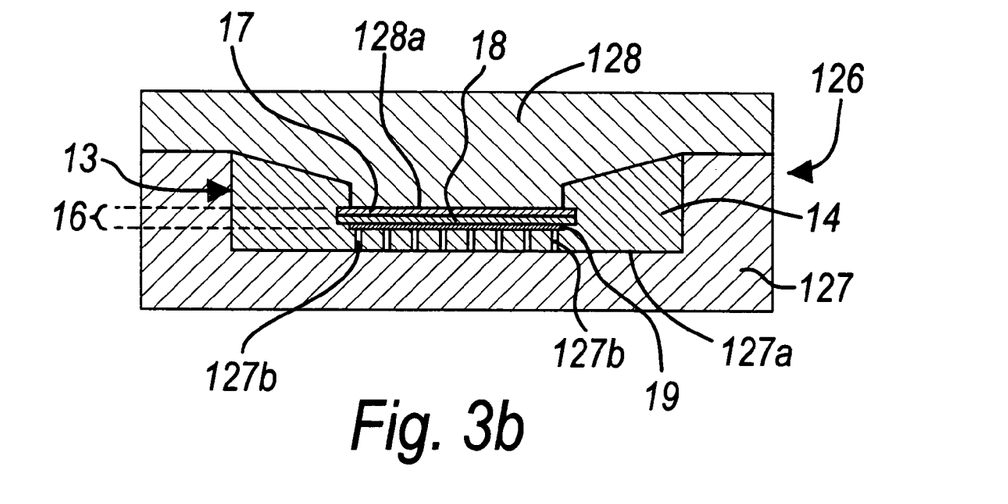
FIG. 3b is a schematic sectional view of a third mold for manufacturing a sole according to the invention.

With reference to FIG. 3b, a third mold, of the injection type, is designated by the reference numeral 126.

Pins 127b, which form the negative of the through holes 15, are provided on the bottom 127a of the lower mold 127.

In this case, the pack 16 is applied on the pins 127b, the membrane 17 facing the lower (half) mold 27.

After closing the upper mold 128, said pack 16 is pressed against said pins 128b.

The polymeric material is injected so as to form the tread 14 which surrounds the pack 16.

The mold 126 is then opened and the sole 13 is extracted.

In both cases, if necessary, a perforated or equivalently vapor-permeable filler layer 30 is applied on the membrane-side of the multilayer pack 16 (the filler layer 30 has smaller surface dimensions then membrane 17 so as to allow the upward sealing of the pack 16) before inserting the pack 16 into the mold 26 or 126.

The filler layer 30 and the pack 16 are pre-assembled before applying them into the mold or composed thereon layer by layer.

Once the sole 13 has been extracted, it is assembled to the upper portion 11 for example by perimetric adhesive bonding.

It is possible to overmold the sole 13 directly onto the upper portion 11, which is preassembled onto an upper supporting last.

Figure 4:
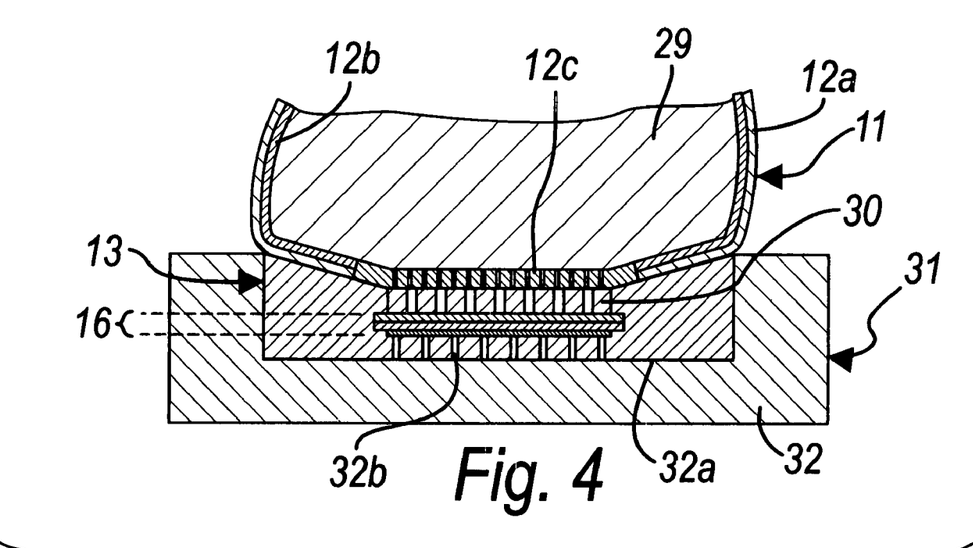
FIG. 4 is a schematic sectional view of a fourth mold for manufacturing a shoe with a sole according to the invention.

In this case, with reference to FIG. 4, it is necessary to preassemble the upper 12a with the lining 12b together with the insole 12c onto a last 29 for direct injection molding onto the upper.

Then, if necessary, depending on the thickness of the sole to be provided, a perforated or equivalently vapor-permeable filler layer 30 is applied for example by means of adhesive distributed in spots to the lower surface of the insole 12c (the filler layer 30 must have smaller surface dimensions than the membrane 17 so as to allow the upward sealing of the pack 16).

The pack 16 is then applied to the lower surface of the filler layer 30, for example by spot gluing.

In this case also, it is possible to preassemble the pack 16 before applying it to the filler layer 30 or to compose it thereon layer by layer; moreover, it is possible to preassemble the pack also with the filler layer 30 and apply it directly to the insole 12c.

The last 29 composes a fourth mold, of the type for direct injection molding onto an upper, which is generally designated by the reference numeral 31; in particular, the last 29 closes in an upward region a lower (half) mold 32, on the bottom 32a of which the pins 32b are provided which define the negative of the through holes 15 of the tread 14.

The last 29 with the upper portion 11 and the pack 16 is closed onto the lower mold 32, pressing the pack onto the pins 32b; then the polymeric material is injected, surrounds the pack 16 and becomes monolithic perimetrically with the upper 12a, forming the tread 14.

As an alternative, it is possible to apply the pack 16, with or without the filler layer 30, directly as a mold insert on the pins 32b and then close the mold with the upper supporting last.

In this last case also, it is possible to preassemble the pack 16 before arranging it in the mold or compose it thereon layer by layer.

Figure 5:
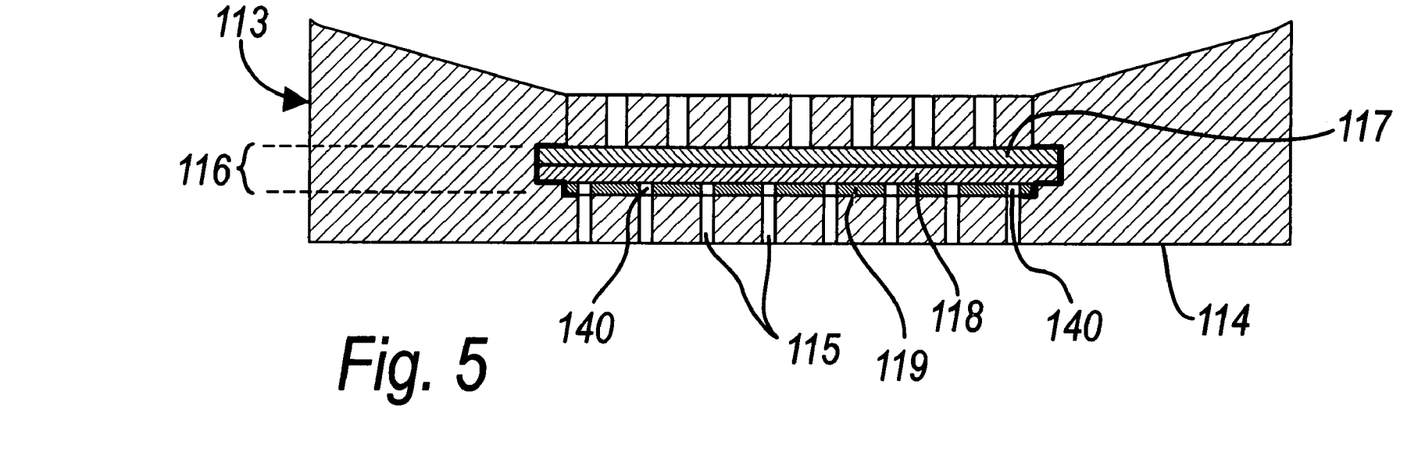
FIG. 5 is a schematic sectional view of an embodiment of a sole which is a variation with respect to the embodiment of the preceding figures.

In constructive variations of the sole, now generally designated by the reference numeral 113, the layer-like element, now designated by the reference numeral 119, can be perforated, with holes 140 which have for example the same size and distribution as the pins of the mold which provide the holes 115 of the tread 114 (in practice, the holes 140 are arranged coaxially on the holes 115).

In this manner, the layer-like element 119, or alternately the pack 116 constituted by the membrane 117, by the protective layer 118 and by the layer-like element 119 (which is perforated), can be arranged on the pins of the mold, so that they rest directly on the protective layer 118 of the membrane 117.

According to this embodiment, the material that constitutes the layer-like element 119 can also be a non-vapor-permeable material, such as for example a polymeric material which is compatible with the material that constitutes the sole.

In this manner, the holes of the tread, provided by means of the pins of the mold, are not blocked by the layer-like element, which is used to protect the membrane and the protective layer against the injection of polymeric material, but directly connect to the outside the membrane 117 associated with its protective layer 118.

It is evident that the lining 12b associated with the upper 12a can be of the type which is composed of a perforated or vapor-permeable inner layer and an outer layer which is composed of a vapor-permeable and waterproof membrane, thus obtaining a shoe which is completely waterproof and vapor-permeable.

Figure 6:
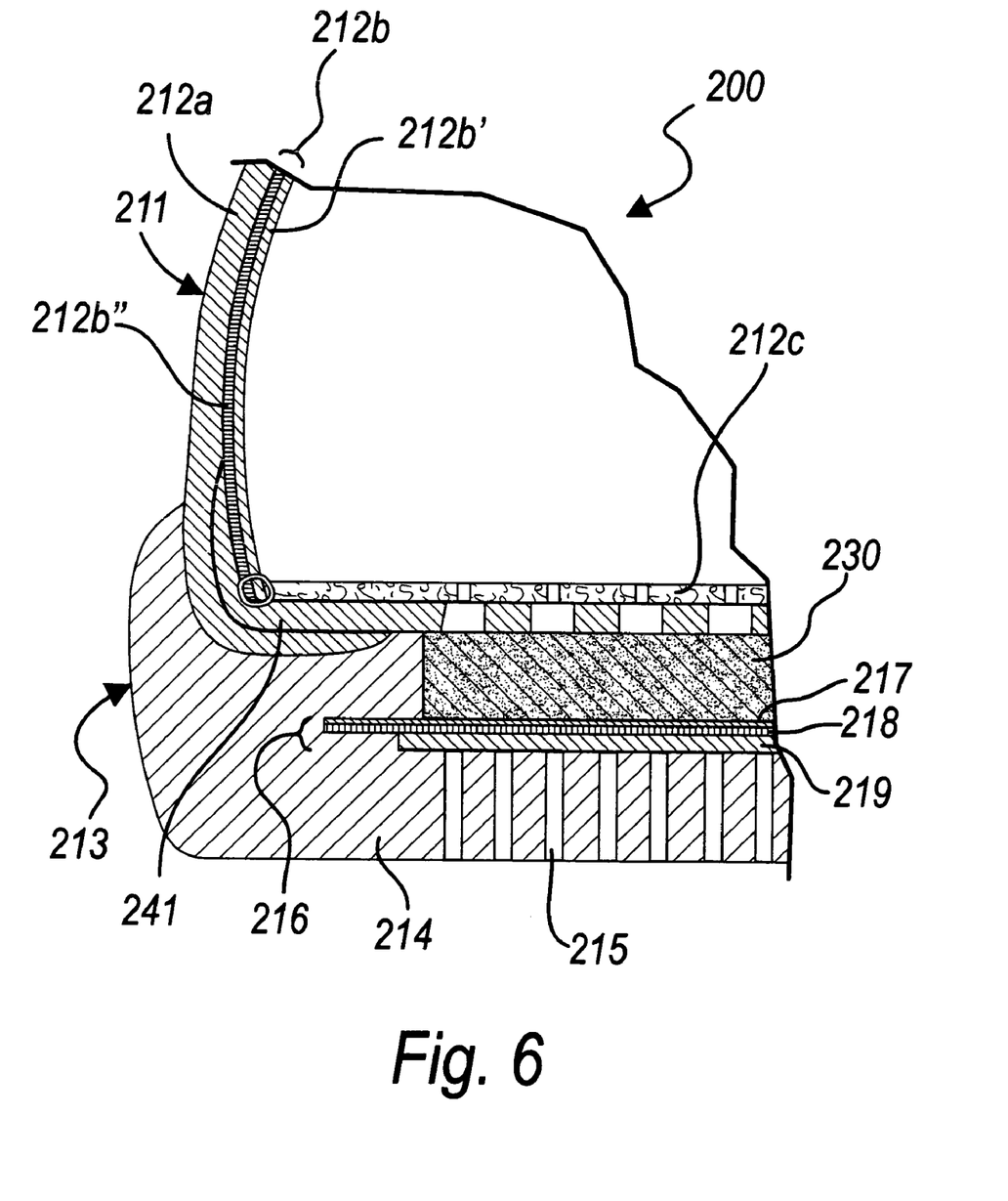
FIG. 6 is a schematic view of a portion of a shoe according to the invention, which is completely waterproof and vapor permeable.

For example, with reference to FIG. 6, an embodiment is shown of a shoe which is entirely waterproof and vapor-permeable according to the invention and is designated by the reference numeral 200.

In this embodiment, the upper portion 211 of the shoe 200, commonly known as lasted assembly if it is fitted onto a shoe last, is constituted by a vapor-permeable upper 212a, by a lining 212b composed of a vapor-permeable or perforated inner layer 212b' and an outer layer 212b'', which is constituted by a vapor-permeable and waterproof membrane; a perforated (or equivalently vapor-permeable) insole 212c is fixed to the upper 212a with the lining 212b and is joined for example by means of stitches to the edges of the inner layer 212b' of the lining 212b, according to the structure commonly known as Strobel, and by a waterproof inshoe 241, which is associated with the insole 212c and with the outer layer 212b'' (the membrane) of the lining 212b, so as to be superimposed on the region that joins said insole and the membrane so as to provide a perimetric seal.

The upper 212a adheres to the inshoe 241 and its lower edge is folded and glued below said inshoe 241.

As mentioned, the inshoe 241 is made of waterproof and vapor-permeable material or has suitable holes at the region of the sole that is designed for vapor permeation.

In an extreme case, the inshoe can have a single large hole, in practice constituting a ring or band made of waterproof material for providing a seal at the region joining the lining 212b to the membrane and the insole.

The sole 213, provided as described in the previous embodiments, can be applied by adhesive bonding to the assembly thus obtained, which is fitted onto a polyethylene last, or can be provided by direct overmolding by injection onto the assembly fitted onto a last for direct injection molding.

For example, it is possible to associate with the lower portion of the inshoe 241, by means of a few drops of adhesive, the vapor-permeable or perforated filler element 230, the membrane 217 with its protective layer 218 and the layer-like element 219.

The filler layer 230 and the layer-like element 219 are smaller than the membrane 217 associated with the protective layer 218.

The upper portion 211 with the pack 216 is inserted and fitted on a last for direct injection molding, moving the layer-like element 219 into contact with the lower portion of the mold provided with the pins needed to obtain the holes 215 in the tread 214, and the sole is overmolded, said sole being constituted by the perforated tread and by the perimetric portion, forming a seal on the upper 212a, the inshoe 241 and the pack 216.

In any case, the sole is associated hermetically with the lasted assembly only at the upper 212a and at the exposed region of the inshoe 241 without affecting the central portion entrusted with vapor permeation.

In practice it has been found that the invention thus described achieves the intended aim and objects.

The present invention has in fact provided a molding method for providing a sole (and a shoe provided with said sole) which is equipped with a vapor-permeable and waterproof membrane which does not allow damage to the membrane.

This has been achieved in practice by introducing in the sole a layer-like element which is interposed between the protective layer of the membrane and the through holes of the tread.

Such layer-like element further allows to increase the vapor permeability of the sole, since it forms at the interface with the protective layer areas which allow the movement of the water vapor over regions which are not obstructed by polymeric material.

The invention thus conceived is susceptible of numerous modifications and variations, all of which are within the scope of the appended claims; all the details may further be replaced with other technically equivalent elements.

In practice, the materials used, so long as they are compatible with the specific use, as well as the dimensions, may be any according to requirements and to the state of the art.

The disclosures in Italian Patent Application No. PD2006A000437 from which this application claims priority are incorporated herein by reference.

The invention claimed is:

1. A vapor-permeable and waterproof sole for shoes, comprising:
    a tread provided with a plurality of through holes;
    a multilayer pack, which is arranged so as to be superimposed on the region where said through holes are provided and comprises a membrane which is permeable to water vapor and impermeable to liquids and a protective vapor-permeable or perforated layer, which is arranged directly below said membrane;
    said tread being overmolded onto said pack, said tread further surrounding the lower perimetric portion, the upper perimetric portion and the edges of said pack so as to form a perimetric seal which is adapted to avoid the rise of liquids, wherein said pack comprises a vapor-permeable or perforated layer element, which is arranged directly below said protective layer so as to be superimposed on the region where said through holes are provided, said layer element being adapted to avoid the contact of a polymeric material for molding with said protective layer during the step for molding the tread, said layer element being further associated with said protective layer, forming at least one interface area through which water can flow, between said protective layer and said layer element, said area being adapted to facilitate vapor permeation,
    wherein said layer element is constituted by water-repellent and vapor-permeable material, which is capable of creating a barrier to the polymeric material which constitutes said tread, and
    wherein said layer element is constituted by one of the following materials: nonwoven fabric or pile fabric or needle felt, leather, microporous EVA.

2. The vapor-permeable and waterproof sole for shoes according to claim 1, wherein said layer element has smaller surface dimensions than said membrane and said protective layer, the perimetric edge of said layer element being spaced from the edge of said protective layer.

3. The vapor-permeable and waterproof sole for shoes according to claim 1, wherein said layer element is provided, on the face for contact with said protective layer, with adhesive which is distributed in spots or lines and is adapted to ensure, during production, that said layer element adheres to said protective layer, keeping said multilayer pack together.

4. The vapor-permeable and waterproof sole for shoes according to claim 1, wherein the surface dimensions and the shape of said protective layer are substantially the same as those of said membrane.

5. The vapor-permeable and waterproof sole for shoes according to claim 4, wherein the perimetric edge of said protective layer has a reduced thickness.

6. The vapor-permeable and waterproof sole for shoes according to claim 1, wherein said protective layer has smaller surface dimensions than said membrane, with its perimetric edge spaced from the edge of said membrane.

7. The vapor-permeable and waterproof sole for shoes according to claim 1, wherein said protective layer is made of water-repellent material.

8. The vapor-permeable and waterproof sole for shoes according to claim 7, wherein said protective layer is constituted by one of the following materials: woven fabric, non-woven fabric, pile fabric or needle felt.

9. The vapor-permeable and waterproof sole for shoes according to claim 8, wherein said membrane and said protective layer are coupled one another by spot gluing by means of an adhesive which is resistant to hydrolysis.

10. The vapor-permeable and waterproof sole for shoes according to claim 1, wherein said layer element is provided with through holes which have substantially the same size and distribution as said holes of the tread and are arranged coaxially thereon.

11. The vapor-permeable and waterproof sole for shoes according to claim 1, wherein a perforated or vapor-permeable filler layer is applied on the top of said multilayer pack, said membrane facing said filler layer.

12. The vapor-permeable and waterproof sole for shoes according to claim 11, wherein said filler layer has smaller surface dimensions then said membrane so as to allow the upward sealing of the pack.

13. A shoe, comprising:
an upper portion which is composed of a vapor-permeable upper, on the inner part of which there is a lining which is also vapor-permeable or perforated, said upper with lining being closed in a downward region by an insole which is vapor-permeable or perforated,
a sole according to claim 1 being associated in a downward region with said upper with lining.

14. The shoe according to claim 13, wherein said lining is composed of a vapor-permeable or perforated inner layer and an outer layer which is constituted by a waterproof and vapor-permeable membrane.

15. The shoe according to claim 14, further comprising:
a waterproof inshoe, associated with said insole and with said outer layer of said lining, so as to be superimposed on a connection region between said insole and said outer layer so as to provide a perimetric seal, said upper adhering to said inshoe and having its lower edge folded and glued under said inshoe, said inshoe being further vapor-permeable or having at least one hole at the region of the sole designed for vapor permeation.

16. A method for molding by casting to provide a sole according to claim 1, comprising:
applying the multilayer pack to the top of an upper mold;
casting the polymeric material that forms the tread into a lower mold, on the bottom of which pins are provided which form the negative of said through holes of the tread;
closing the mold formed by the two molds and allowing for the tread to harden, said pack being pressed against said pins; and
opening the mold and extracting the sole.

17. The molding method according to claim 16, wherein said pack is preassembled before applying it to said upper mold.

18. The molding method according to claim 16, wherein said pack is composed layer by layer in a mold.

19. The molding method according to claim 16, wherein a perforated or vapor-permeable filler layer is applied between the top of said upper mold and the top of said multilayer pack, said membrane facing said filler layer.

20. A method for molding by injection to provide a sole according to claim 1, comprising:
applying said pack to the bottom of a lower mold, the membrane side of said pack facing it;
closing an upper mold onto the lower mold, pins being provided on the top of said upper mold and forming the negative of said through holes of the tread, said pack being pressed against said pins;
injecting the polymeric material so as to form said tread;
opening the mold formed by the two molds; and
extracting the sole.

21. The molding method according to claim 20, wherein said pack is preassembled before applying it to said lower mold.

22. The molding method according to claim 20, wherein said pack is composed layer by layer in a mold.

23. The molding method according to claim 20, wherein a perforated or vapor-permeable filler layer is applied between the bottom of said lower mold and said multilayer pack, the membrane side of said pack facing said filler layer.

24. A method for molding by injection to provide a sole according to claim 1, comprising:
applying said pack on pins, provided on the bottom of a lower mold and forming the negative of said through holes of the tread;
closing an upper mold onto the lower mold, said pack being pressed against said pins;
injecting the polymeric material so as to form said tread;
opening the mold formed by the two (half) molds; and
extracting the sole.

25. The molding method according to claim 24, wherein said pack is preassembled before applying it on said pins.

26. The molding method according to claim 24, wherein said pack is composed layer by layer in said mold.

27. The molding method according to claim 24, wherein a perforated or vapor-permeable filler layer is applied between the top of the upper mold and the multilayer pack, said membrane facing said filler layer.

28. A method for manufacturing a shoe according to claim 13, comprising:
preassembling the upper with lining, together with the insole, on a last for direct injection-molding onto the upper;
applying a perforated or vapor-permeable filler layer to the lower surface of said insole;
applying said pack to the lower surface of said filler layer;
closing an upper mold onto a lower mold on the bottom of which pins are provided which define the negative of the through holes of the tread, said pack being pressed against said pins;
injecting the polymeric material that forms the tread so as to be partially superimposed on said upper; and
opening the mold and extracting the shoe from said last.

29. The molding method according to claim 28, wherein said pack is preassembled before applying it to said lower filler layer.

30. The molding method according to claim 28, wherein said pack is composed layer by layer directly on said lower filler layer.

31. The molding method according to claim 28, wherein said filler layer is assembled to said pack and subsequently fixed with said pack to the insole.

32. A method for manufacturing a shoe provided with a sole according to claim 13, comprising:

applying said pack to the bottom of a lower mold, pins which define the negative of the through holes of the tread being provided on said bottom;

preassembling the upper with lining, together with the insole, onto a last for direct injection molding onto the upper;

applying a perforated or vapor-permeable filler layer to the lower surface of said insole or to said pack;

closing an upper mold onto said lower mold, said pack being pressed against said pins;

injecting the polymeric material that forms the tread so as to be partially superimposed on said upper; and opening the mold and removing the shoe from said last.

33. A method for manufacturing a shoe with a sole according to claim 16, comprising providing said pack comprising said layer-like element with smaller surface dimensions than said membrane and said protective layer.

34. A vapor-permeable and waterproof sole for shoes, comprising:

a tread provided with a plurality of through holes;

a multilayer pack, which is arranged so as to be superimposed on the region where said through holes are provided and comprises a membrane which is permeable to water vapor and impermeable to liquids and a protective vapor-permeable or perforated layer, which is arranged directly below said membrane;

said tread being overmolded onto said pack, said tread further surrounding the lower perimetric portion, the upper perimetric portion and the edges of said pack so as to form a perimetric seal which is adapted to avoid the rise of liquids, wherein said pack comprises a vapor-permeable or perforated layer element, which is arranged directly below said protective layer so as to be superimposed on the region where said through holes are provided, said layer element being adapted to avoid the contact of a polymeric material for molding with said protective layer during the step for molding the tread, said layer element being further associated with said protective layer, forming at least one interface area through which water can flow, between said protective layer and said layer element, said area being adapted to facilitate vapor permeation, wherein said layer element has smaller surface dimensions than said membrane and said protective layer, the perimetric edge of said layer element being spaced from the edge of said protective layer.

* * * * *